United States Patent
Kanbe et al.

[11] Patent Number: 6,159,562
[45] Date of Patent: Dec. 12, 2000

[54] DISCOTIC LIQUID CRYSTAL DEVICE AND ALIGNMENT METHOD THEREFOR

[75] Inventors: Junichiro Kanbe, Machida; Takao Takiguchi, Tokyo; Takeshi Togano, Chigasaki; Shinichi Nakamura, Isehara; Takashi Moriyama, Atsugi, all of Japan

[73] Assignee: Canon Kabushiki Kaisha, Tokyo, Japan

[21] Appl. No.: 09/412,434

[22] Filed: Oct. 5, 1999

[30] Foreign Application Priority Data

Oct. 5, 1998 [JP] Japan .................................. 10-296235

[51] Int. Cl.[7] .......................... G02F 1/1337; G02F 1/1333
[52] U.S. Cl. .............................................. 428/1.1; 349/182
[58] Field of Search ..................... 349/130, 124, 349/125, 182; 428/1.1, 1.2

[56] References Cited

U.S. PATENT DOCUMENTS

| | | | |
|---|---|---|---|
| 4,965,591 | 10/1990 | Kurabayashi et al. | 346/108 |
| 5,038,166 | 8/1991 | Isaka et al. | 355/27 |
| 5,059,000 | 10/1991 | Kaneko et al. | 350/351 |
| 5,066,107 | 11/1991 | Yoshinaga et al. | 359/45 |
| 5,103,332 | 4/1992 | Kaneko et al. | 359/98 |
| 5,140,447 | 8/1992 | Kaneko et al. | 359/43 |
| 5,141,785 | 8/1992 | Yoshinada et al. | 428/1 |
| 5,164,741 | 11/1992 | Kaneko et al. | 346/1.1 |
| 5,285,298 | 2/1994 | Kaneko et al. | 359/43 |
| 5,339,306 | 8/1994 | Yoshinaga et al. | 369/275.1 |
| 5,688,437 | 11/1997 | Sato et al. | 252/299.61 |
| 5,942,612 | 8/1999 | McKeown et al. | 349/182 |

OTHER PUBLICATIONS

J. Chem. Soc., Chem, Communications, vol. 24, Dec. 1985, pp. 1794–1796.
Nature, vol. 371, No. 6493, Sep. 1994, pp. 141–143.
Journal of the American Chemical Society, vol. 104, No. 19, Sep. 1982, pp. 5245–5247.
Pramana, Journal of Physics, vol. 9, No. 5, Nov. 1977, pp. 471–480.
Physical Review Letters, vol. 70, No. 4, Jan. 1993, pp. 363–460.

*Primary Examiner*—Alexander S. Thomas
*Attorney, Agent, or Firm*—Fitzpatrick, Cella, Harper & Scinto

[57] ABSTRACT

A layer of discotic liquid crystal having a molecular structure including a disk-shaped core and plural side chains connected to the core is disposed in contact with a substrate boundary provided with a homeotropic alignment power for aligning the side chains of the discotic liquid crystal molecules vertically to the boundary, whereby a uniform columnar structure vertical to the substrate of the discotic liquid crystal is formed. As a result, a discotic liquid crystal device having a stable homeotropic monodomain alignment can be formed from a wide scope of discotic liquid crystal materials.

8 Claims, 3 Drawing Sheets

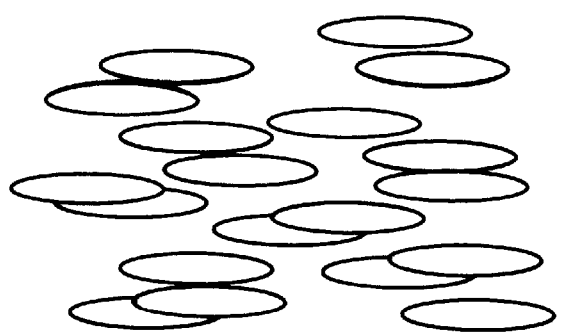
FIG. IA
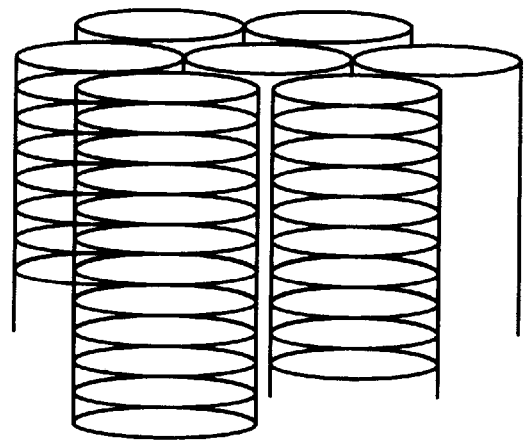
FIG. IB
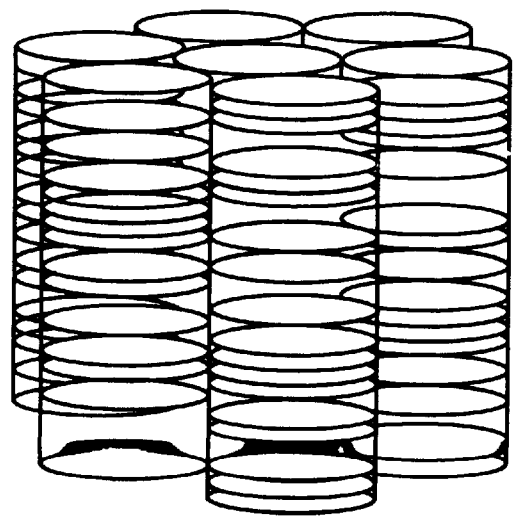
FIG. IC

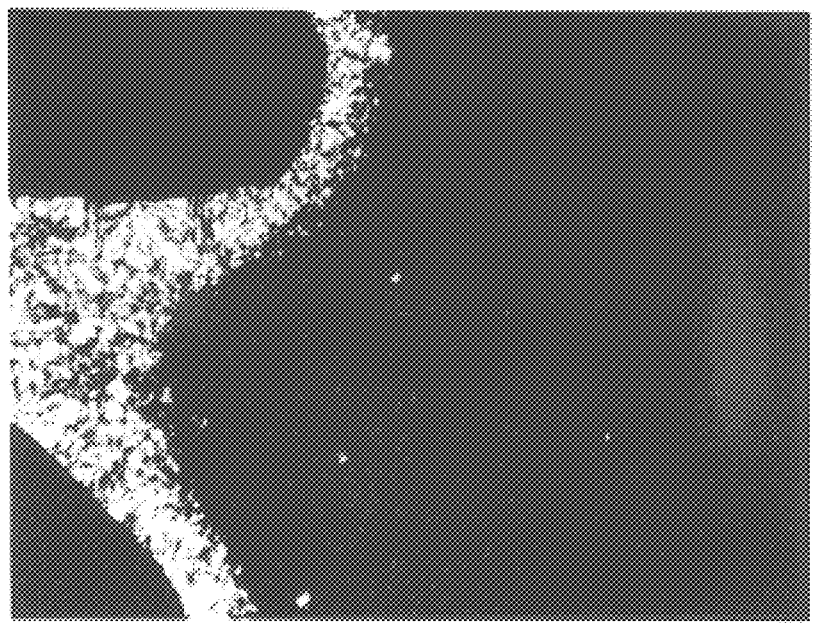
F I G. 4
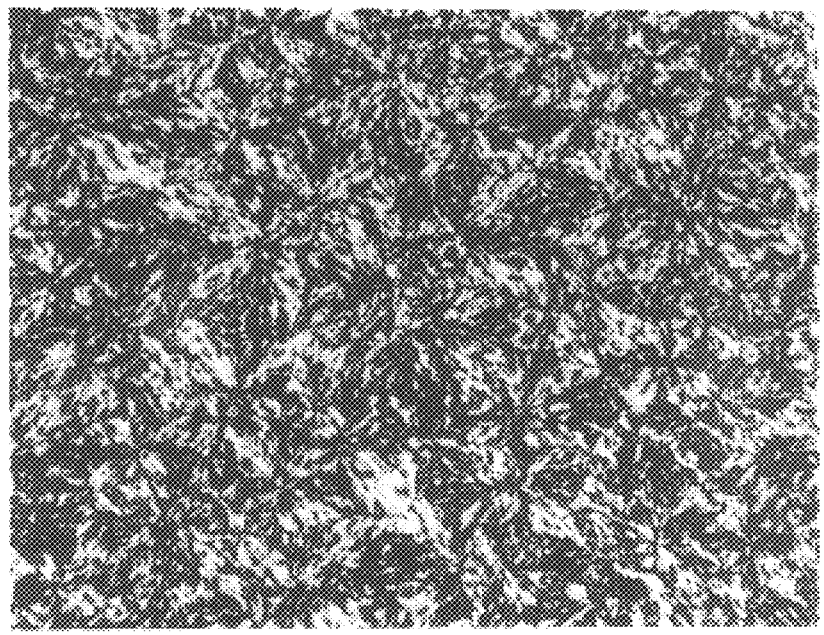
F I G. 5

DISCOTIC LIQUID CRYSTAL DEVICE AND ALIGNMENT METHOD THEREFOR

FIELD OF THE INVENTION AND RELATED ART

The present invention relates to a liquid crystal device wherein a compound showing a discotic liquid crystal phase is uniformly aligned with a regularity to exhibit its functions, and an aligning method therefor.

Discotic liquid crystal phase is a liquid crystal phase discovered in 1977 by Chandrasekhar, et al. (Pramana, 9, 471 (1977)). As described in their paper entitled "Discotic Liquid Crystals" (Rep. Prog. Phys., 53, 57 (1990)) and in a paper entitled "Design and Synthesis of Discotic Liquid Crystal Molecules (in Japanese)" by Shunsuke Takenaka (Japanese Chemical Society, Seasonal Publication, General Review, vol. 22, pp. 60-), the discotic liquid crystal phase is found in compounds having a disk-shaped core and a plurality of relatively long chains connected to the core. Such compounds may be classified into various types according to their core structure, inclusive of derivatives of hexa-substituted benzene and tri-substituted benzene; derivatives of phthalocyanine and porphyrin; derivatives of triphenylene, truxene and pyrylium, respectively; tribenzocyclononene derivatives, azacrown derivatives, and cyclohexane derivatives.

The liquid crystal structure of discotic liquid crystal phases may vary depending on compound species and temperatures and may be classified as follows.

Nd phase (discotic nematic phase) has a lowest degree of order as illustrated in FIG. 1A, wherein molecular directions (directors) are aligned in one direction but no regularity is found regarding the position of respective molecules.

Dh (hexagonal) phase, Dr (rectangular) phase, Dt (tetragonal) phase, etc., exhibit a clear two-dimensionally ordered structure regarding the position of respective molecules, wherein suffixes h, r, t, etc., represent a characteristic of two-dimensional symmetry. These phases are classified into one having a clear periodical structure and the other having no such periodical structure, regarding the remaining one dimension, i.e., the direction of lamination or stacking of the disk-shaped cores, which are called an ordered phase and a disordered phase, respectively, and represented by e.g., Dho and Dhd, respectively, in the case of hexagonal phase. The ordered phase and the disordered phase can be discriminated from each other by a diffraction peak width according to X-ray diffraction analysis. The structure of the ordered phase and the disordered phase are schematically represented in FIGS. 1B and 1C, respectively.

Based on the structural characteristic of a discotic liquid crystal, several reports have been made suggesting application thereof to devices. A system including conjugated π-electrons as found in derivatives of phthalocyanine or triphenylene can provide a channel for electrons (or holes) (Piechocki, et al; J. Am. Chem. Soc. 1982, 104, pp. 5245). Further, a system including an annular core as found in an aza-crown derivative, can provide a molecular channel using the central spacing thereof as a selective molecular passage (Lehn, et al.; J. Chem. Soc., Chem. Commun., 1985, pp. 1794).

In order to allow a smooth flow of either electrons or molecules through a channel, it is important that discotic liquid crystal molecules are orderly aligned to form a monodomain over a sufficiently broad region. In this regard, few previous reports are consciuns of alignment in D phase, i.e., discotic phase having a columnar structure, and the inserted polarization microscopic photographs are understood to fail in realizing uniform alignment but have resulted in only multi-domains. It is however reported that HPT (hexapentyloxy-triphenylene) which is a compound of $R=-OC_5H_{11}$ in a general formula (I) below:

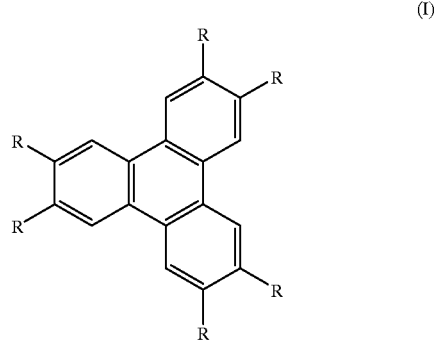

(I)

was sandwiched between a pair of quartz plates each coated with a semitransparent aluminum film to form a cell structure, heat-melted and then gradually cooled to a liquid crystal phase, whereby a uniform monodomain was formed (D. Adam, et al; Phys. Rev. Lett., 70 (1993) pp. 457). A very good photoconductivity was reported to be attained at that time. It has been also reported that a good photoconductivity was attained by using HHTT (2,3,6,7,10,11-hexahexylthiotriphenylene) which is a compound of $R=-SC_6H_{13}$ in the same formula (I) above, and application thereof for a photosensitive member for electrophotography, as an activation layer of LED and to an organic transistor (D. Adam. et al.; Nature, 371 (1994), pp. 141-).

However, in our attempt of using an identical cell structure for aligning C-12,18-N6 azacrown (i.e., 1,4,7,10,13,16-hexa (4-dodecyloxybenzoyl)-1,4,7,10,13,16-hexaazacyclooctadecane) which is a compound of $R=-CO-Ph-OC_{12}H_{25}$ (wherein Ph denotes a phenylene group) in the following general formula (II):

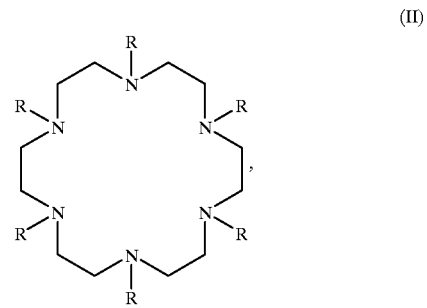

(II)

monodomain alignment was failed but only multi-domains resulted. The appearance of the resultant cell was close to the polarization photographs inserted in the above-mentioned report of Lehn, et al., and was unfit for practical use. As a further effort, C-16,18-N6 azacrown (i.e., i,4,7,10,13,16-hexa(4-hexyloxybezoyl)-1,4,7,10,13,16-hexaazacyclooctadecane) which is a compound of $R=-CO-Ph-OC_{16}H_{33}$ in the above formula (II), was synthesized, and alignment thereof was evaluated in an identical cell structure, whereas monodomain alignment was also failed. The alignment failure of these cyclic crown compounds may be attributable to a relatively weak interaction with the substrate surfaces of the core of a cyclic compared presumably because of its flexible structure, compound with a relatively strong interaction for homogeneously aligning the triphenylene core with respect to the substrate surfaces.

In order to solve alignment failures as obtained in cyclic crown compounds represented by the above general formula (II), and stably provide a columnar monodomain over a substrate by using a wide scope of discotic liquid crystal compounds, it is necessary to establish a stronger alignment force over the substrate surface.

SUMMARY OF THE INVENTION

More specifically, a principal object of the present invention is to provide a discotic liquid crystal device wherein an interaction between a discotic liquid crystal and a substrate surface is enhanced to provide a monodomain (homeotropic monodomain) wherein columns of a discotic liquid crystal are uniformly aligned in a vertical direction with respect to the substrate even when a broader scope of discotic liquid crystals are used.

Another object of the present invention is to provide an alignment method for providing such a discotic liquid crystal device.

Another object of the present invention is to provide an application device utilizing a preferential charge transporting channel characteristic in a direction vertical to the substrates of homeotropic monodomain established in such a discotic liquid crystal device.

According to our study for accomplishing the above-mentioned objects, it has been found very effective to impart a homeotropic alignment power to a substrate, vertically align plural side chains of a discotic liquid crystal molecule owing to the homeotropic alignment power and thereby indirectly align cores of the discotic liquid crystal molecules homogeneously relative to the substrates, thereby developing a homeotropic monodomain wherein the homogeneously aligned cores are stacked in a columnar state, rather than to have the homogeneous alignment power of the substrate directly act on the cores of the discotic liquid crystals molecules.

Thus, according to the present invention, there is provided a discotic liquid crystal device, comprising: a substrate, and a discotic liquid crystal layer disposed in contact with the substrate and comprising discotic liquid crystal molecules each having a disk-shaped core and plural side chains connected to the core; wherein, in the discotic liquid crystal layer, the plural side chains of the discotic liquid crystal molecules are aligned vertically to the substrate at the boundary with the substrate, thereby forming a uniform columnar structure of discotic liquid crystal vertical to the substrate.

According to another aspect of the present invention, there is provided a method of aligning discotic liquid crystal, comprising: disposing in contact with a substrate a layer of discotic liquid crystal comprising discotic liquid crystal molecules each having a disk-shaped core and plural side chains connected to the core, and in the discotic liquid crystal layer, aligning the plural side chains of the discotic liquid crystal molecules vertically to the substrate, thereby forming a uniform columnar structure of discotic liquid crystal vertical to the substrate. The thus-aligned discotic liquid crystal layer may be, after being reinforced in its shape-retaining rigidity as desired, peeled apart from the substrate to form a single-layered functional device or be applied again onto another substrate to provide another functional device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 1A–1C are schematic views for illustrating alignment states in some phases of discotic liquid crystal inclusive of a discotic nematic phase (FIG. 1A), a discotic ordered phase FIG. 1B), and a discotic disordered phase (FIG. 1C).

FIG. 4 is a polarization microscopic photograph (×100) showing a homeotropic monodomain alignment state of discotic liquid crystal in a cell of Example 3.

FIG. 5 is a polarization microscopic photograph (×100) showing a multi-domain alignment state of discotic liquid crystal in a cell of Comparative Example 6.

DETAILED DESCRIPTION OF THE INVENTION

Figure 2:
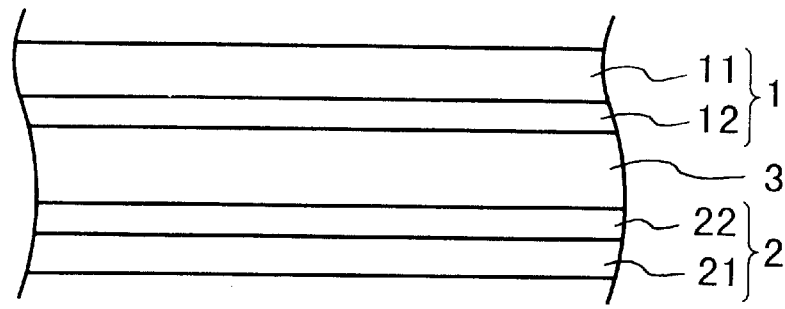
FIG. 2 is a schematic sectional view of an embodiment of the discotic liquid crystal device according to the invention.

FIG. 2 is a partial schematic sectional view of an embodiment of the discotic liquid crystal device according to the invention. Referring to FIG. 2, the discotic liquid crystal device according to the present invention generally has a structure as shown including a pair of substrates 1 and 2 and a discotic liquid crystal 3 disposed between the substrates. The substrates 1 and 2 are generally electroconductive, and they per se can comprise a laminate structure including a (non-electroconductive) substrate 11 and an electroconductive layer 12, or a (non-electroconductive) substrate 21 and an electroconductive layer 22.

Based on such a general structure as described above, it is possible to form a photoconductive device or a light-emitting device including electron channels, or a sensor or an electrochromic display device including ion channels. In this instance, the above-mentioned conductor layer 12 or 22 may be replaced with a layer of material or structure having a desired function for the intended purpose.

In the case of constituting a liquid crystal device as an electrooptical device, at least one of the substrates 11 and 21 may preferably comprise a transparent material, such as glass or transparent plastic, and at least open of the conductor layers 12 and 22 may preferably comprise a transparent conductor, such as tin oxide or indium tin oxide (ITO). The conductor layers 12 and 22 can be patterned, as desired, in a pattern, such as stripes, mosaics or dispersive dots.

In the case of forming a device including ion channels, it is preferred to dissolve a salt functioning as a cation or anion source in a discotic liquid crystal material having a cyclic structure.

As mentioned above, a characteristic of the discotic liquid crystal device according to the present invention is that it is applicable to a wide scope of discotic liquid crystals. Thus, as the discotic liquid crystal 3 used in the present invention, it is possible to use a discotic liquid crystal in general comprising a compound having a disk-shaped core and plural (preferably three or more) side chains, preferably having substantially identical lengths, attached to the core. Examples thereof may include: triphenylene-based discotic liquid crystals represented by the above-mentioned formula (I), azacrown compounds by represented by the above-mentioned formula (II), phthalocyanine compounds represented by formula (III) described below, and other compounds, such as porphyrin derivatives, cyclohexane derivatives, triphenylene derivatives, and pyrylium derivatives.

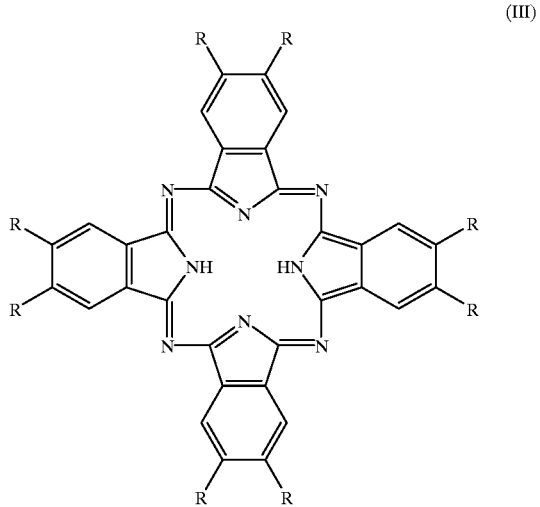

(III)

As a result of our study, particularly based on X-ray diffraction analysis, in order to form a uniform homeotropic monodomain of discotic liquid crystal phase in the course of temperature decrease from isotropic phase, it has been found preferable to use a liquid crystal material exhibiting a discotic disordered phase shown in FIG. 2C rather than a liquid crystal material exhibiting a discotic ordered phase shown in FIG. 2C as a phase directly below the isotropic phase, because of a moderate (i.e., not too strong) self-organizing power suitable for forming a homeotropic monodomain in response to a constraint force exerted by the substrate boundary. For example, HHTT (R=—SC$_6$H$_{13}$), HHOT (2,3,6,7,10,11-hexahexyloxytriphenylene, R=—OC$_5$H$_{13}$) and HMHOT (R=—(CH$_2$)$_3$CH(CH$_3$)—C$_2$H$_5$) among the triphenylene-type compounds represented by the formula (I); C12,18-N6 azacrown (R=—CO—Ph—OC$_{12}$H$_{25}$) and C16,18-N6 azacrown (R=—CO—Ph—OC$_{16}$H$_{33}$) among the azacrown-type compounds represented by the formula (II), and octadecylthiophthalocyanine (R=—SC$_{18}$H$_{37}$) among the phthalocyanine-type compounds represented by the formula (III), all exhibit a discotic disordered phase directly below isotropic phase and are preferably used, but HBOT (hexabutyloxytriphenylene, R=—OC$_4$H$_8$) among the same triphenylene-type compounds represented by the formula (I) is a material exhibiting a discotic ordered phase directly below the isotropic phase as a result of X-ray diffraction analysis, is liable to leave alignment defects and is therefore a relatively unpreferable discotic liquid crystal material, when used in the liquid crystal device according to the present invention. It is however possible to use a material showing a discotic ordered phase at a lower temperature side without any difficulty if it shows a discotic disordered phase directly below the isotropic phase. This is because a homeotropic monodomain formation in the course of temperature decrease is completed down to a temperature range of discotic disordered phase exhibiting a moderate self-organizing power, and the disordered phase can be transitioned to an ordered phase while retaining the resultant homeotropic monodomain.

The discotic liquid crystal layer 3 may generally be formed in a thickness in a range of 0.01–1000 μm, preferably 0.1–200 μm.

According to the present invention, at least one, preferably both, of the substrates 1 and 2 contacting the above-mentioned discotic liquid crystal material layer 3 are provided with a homeotropic alignment characteristic. This may suitably be accomplished by forming a thin coating film of a surfactant, such as C$_{18}$H$_{37}$Si(OEt)$_3$ (octadecylethoxysilane, abbreviated as ODSE), C$_{18}$H$_{37}$Si(OMe)$_3$, C$_8$F$_{17}$C$_2$H$_4$Si(OMe)$_3$, C$_8$F$_{17}$C$_2$H$_4$Si(OEt)$_3$, or C$_{16}$H$_{33}$NH$_2$, generally known as a homeotropic aligning agent for nematic liquid crystals, etc., in a thickness of mono-molecule to several molecules.

By cooling the discotic liquid crystal material 3 in contact with the boundaries of the substrates 1 and 2 coated with such a homeotropic aligning agent gradually (e.g., at a rate of 0.1–5° C./min.) from isotropic phase to discotic liquid crystal phase, it is possible to accomplish a uniform homeotropic monodomain alignment of not only a triphenylene-type material alignable by gradual cooling between quartz plates, but also an azacrown-type material forming multi-domains by gradual cooling between quartz plates. A mechanism or principle by which excellent homeotropic monodomain alignment of discotic liquid crystal is accomplished, is considered as follows.

Among materials equally classified as discotic liquid crystal materials, azacrown molecules represented by the formula (II), compared with triphenylene-type molecules represented by the formula (I), have a flexible core and do not have a π-electron clowd along the core plane, so that they receive only a weaker constraint force of aligning the core plane parallel to the substrate surface. Accordingly, in case of using a substrate not treated with a homeotropic aligning agent, even if a columnar structure characteristic of a discotic liquid crystal is assumed owing to interaction between liquid crystal molecules, the column directions are not uniformly regulated, thus resulting in multi-domains.

Figure 3:
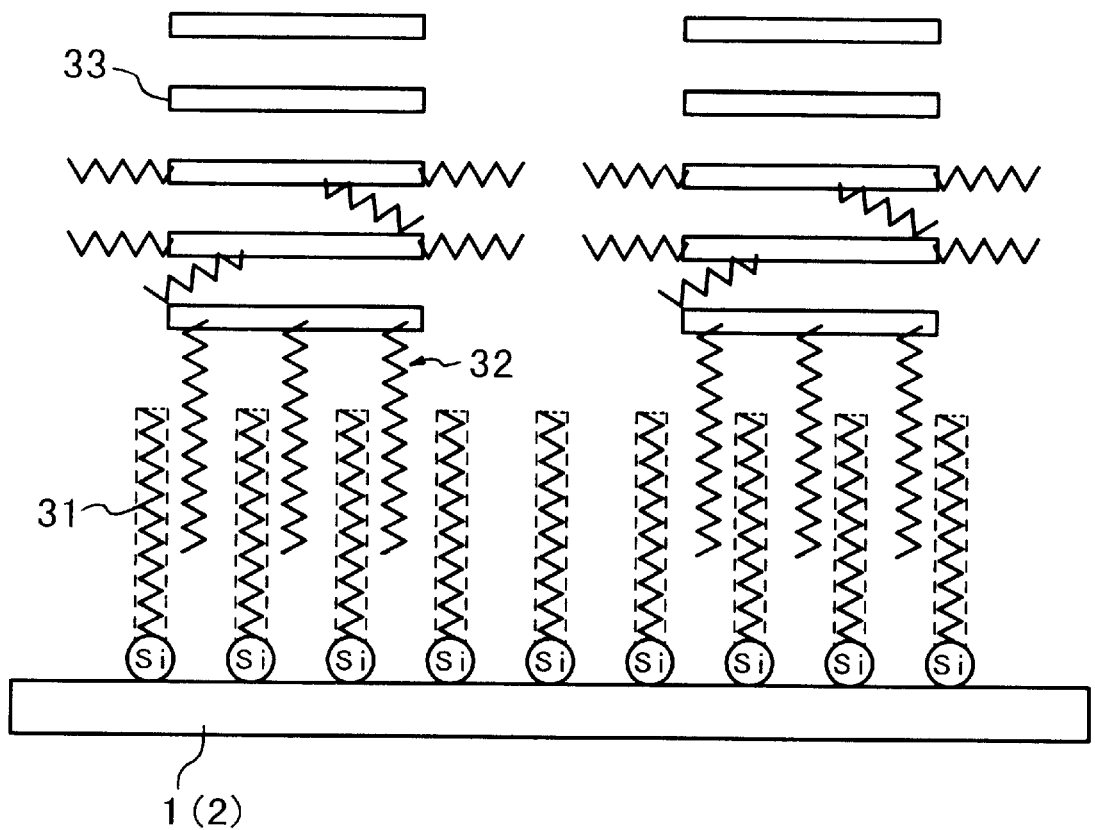
FIG. 3 is a schematic sectional view for illustrating an alignment model in a discotic liquid crystal device according to the invention.

On the other hand, in the case of using a substrate treated with a homeotropic aligning agent of, e.g., ODSE, as shown in FIG. 3, ODSE molecules are aligned on the substrate 1 surface so as to have their alkyl long chains 31 vertically stand up from the substrate surface. Then, alkyl side chains 32 of azacrown molecules having a strong interaction therewith are realigned so as to be aligned parallel to the alkyl long chains 31 of the ODSE molecules, whereby the azacrown molecules receive a strong constraint force so that their cores are aligned parallel to the substrate boundary. Further, the liquid crystal molecules are self-organized in a columnar form due to mutual interaction among the molecules. In this way, it is possible to obtain a monodomain structure wherein each column is aligned vertically to the substrate surface.

As described above, by applying a surface treatment so as to have long chains vertically stand up from the substrate surface, a strong vertical alignment regulation is caused to act on side chains of discotic liquid crystal molecules, whereby it becomes possible to obtain a homeotropic monodomain of discotic liquid crystal wherein the cores of the discotic liquid crystal are aligned parallel to the substrate surface, that is, the columnar direction is vertical to the substrate.

As mentioned earlier, a preferred characteristic of liquid crystal device obtained in the above-described manner is that, owing to a columnar structure of uniformly aligned discotic liquid crystal, a preferential charge-transporting channel is formed between the substrates 1 and 2 along the columnar structure in a direction normal to the substrates. Particularly, in a system of using the triphenylene-type compound represented by the formula (I) or the phthalocyanine-type compound represented by the formula (III), each having a conjugated π-electron structure as the discotic liquid crystal material, an electron (or hole)-transporting channel is formed along the columnar structure. Further, in the case of using an azacrown compound represented by the formula (II) as a discotic liquid crystal material, it is possible to form an ion channel wherein ions are selectively passed through a central hollow column.

EXAMPLES

Hereinbelow, the present invention will be described more specifically based on Examples and Comparative Examples.

Examples 1–3

Three types of substrates were provided, i.e., (a) 0.7 mm-thick washed glass sheets of ca. 10 mm×10 mm in planar size, (b) glass sheets of (a) each coated with a ca. 80 Å-thick semitransparent vapor-deposited gold film, and (c) glass sheets of (a) each coated with a ca. 400 Å-thick vapor deposited ITO film. Three types of substrates were each provided in a pair, and each substrate of each pair was coated with a 0.5 wt. % dilution in ethanol of ODSE (octadecylethoxysilane: $C_{18}H_{37}(OEt)_3$, "ODSE" (trade name) available from Chisso K.K.) by 20 sec. of spin coating at 2000 rpm, followed by drying at 90° C. for 5 min. and baking at 180° C. for 1 hour, thereby providing three pairs of treated substrates.

Onto one of each pair of the treated substrates, ca. 2 μm-dia. silica spacer beads were dispersed, and an epoxy sealing agent was applied onto the other substrate except for the injection port. Then, these substrates were applied to each other so that their ODSE-treated surfaces were opposite to each other, followed by baking at 150° C. for 90 min. Thus, three blank cells were prepared.

Into each of the thus-prepared black cells, C12,18-N6 azacrown of the formula (II) (R=—CO—Ph—$OC_{12}H_{12}$) having a phase transition series of

was injected in its isotropic phase (ca. 160° C.). After the injection, the cell was gradually cooled at a rate of 2° C./min. and observed through a polarization microscope at 130° C. (which is ca. 10° C. lower than the Iso-Dhd phase transition temperature) and at room temperature.

Each of the three cells thus formed exhibited a uniform monodomain which was regarded as in homeotropic alignment, and the alignment state was retained down to room temperature as a supercooled state while exhibiting substantially no texture change.

Representatively, a polarization microscopic photograph at a magnification of 100 of the cell of Example 3 prepared by using a pair of the ITO-coated glass substrates (c) further coated with ODSE is submitted herewith as FIG. 4. In FIG. 4, a rightward black region represents a monodomain region regarded as in a uniform homeotropic alignment, and a leftward white streak pattern portion represents a liquid crystal injection front. Such an alignment disordered portion at the boundary was intentionally incorporated in the photograph for the purpose of focusing in photographing.

Comparative Examples 1–3

Three liquid crystal cells were prepared in he same manner as in Examples 1–3, except for using three pairs of substrates formed by coating three airs of the substrates (a)–(c) used in Examples 1–3 respectively with a polyamic acid (i.e., polyimide precursor, "LP-64" (trade name), available from Toray K.K.) by spin coating, followed by baking at 200° C. for 1 hour to form a 200 Å-thick polyimide film. After the liquid crystal injection, the respective cells were similarly observed at 130° C. and room temperature through the polarization microscope, whereby the respective cells failed in providing a uniform alignment but resulted in multi-domains.

Comparative Examples 4–6

Three liquid crystal cells were prepared in the same manner as in Examples 1–3 except for using three pairs of the substrates (a)–(c) as they were (i.e., without forming ODSE films thereon). After the liquid crystal injection, the respective cells were similarly observed at 130° C. and at room temperature through the polarization microscope whereby the respective cells failed in providing a uniform alignment but resulted in multi-domains.

Representatively, a polarization microscopic photograph (×100) of the cell of Comparative Example 6 prepared by using a pair of the substrates (c) as they were is submitted herewith as FIG. 5. FIG. 5, at a glance, shows the liquid crystal in the resultant cell was in a multi-domain state.

Examples 4–9

Six liquid crystal cells were prepared by filling blank cells each prepared in the same manner as in Example 3 (i.e., blank cells each prepared by using a pair of substrates coated successively with ITO and ODSE) respectively with the following liquid crystal compounds, and were observed though a polarization microscope with respect to the liquid crystal alignment at a temperature of 10° C. below the Iso→D phase temperature temperature the respective compounds:

Example 4

C16,18-N6 azacrown (Formula (II), R=—CO—Ph—$OC_6H_{13}$)

Example 5

Triphenyl-type HHTT (Formula (I), R=—$SC_6H_{13}$)

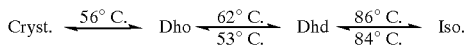

(Dho: discotic hexagonal ordered phase, Dhd: discotic hexagonal disordered phase, Cryst.: crystal phase, Iso: isotropic phase)

Example 6

Triphenyl-type HHOT (Formula (I), R=—$OC_6H_{13}$)

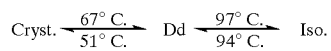

(Dd: discotic disordered phase)

Example 7

Triphenylene-type: HMOT (Formula (I), R=—$(CH_2)_3$—$CH(CH_3)$—$C_2H_5$)

Example 8

Phthalocyanine-type: octaoctadecylthiophthalocyanine (Formula (III), R=—SC$_{18}$H$_{37}$)

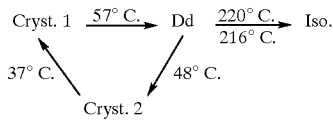

(Cryst. 1: crystal phase 1, Cryst. 2: crystal phase 2, Dd: discotic disordered phase)

Example 9

Triphenylene-type HBOT (Formula (I), R=—C$_4$H$_9$)

As a result, the cell of Example 9 using triphenylene-type HBOT having a discotic ordered phase directly below the isotropic phase exhibited alignment defects which might be regarded as plural domains, while they might be practically acceptable depending on some usage. However, the alignment state was recognized to be much better than that in a control cell prepared by using substrates with no ODSE treatment.

The other liquid crystal cells of Examples 4–8 using liquid crystal compounds having a discotic disordered phase directly below the isotropic phase exhibited a homeotropic monodomain alignment similarly as in Example 3.

Incidentally, C16,18-N6 azacrown used in Example 4 and triphenylene-type HMHOT used in Example 7 are novel compounds, so that examples of synthesis and related data thereof are supplemented below.

(Example 4, Supplement)

Synthesis of C16,18-N6 azacrown (abbreviated name, formal name according to the nomenclature: 1,4,7,10,13,16-hexa(4-hexyloxybenzoyl)-1,4,7,10,13,16-hexaazacyclooctadecane) (Formula II, R=—CO—Ph—OC$_{16}$H$_{33}$).

2 ml of DMF was placed in a flask, and 8.9 g (23.2 mml) of 4-hexyloxybenzoic acid chloride was added thereto and dissolved therein under heating at 60° C. After cooling down to 40° C., 1.0 g (3.86 mmol) of 1,4,7,10,13,16-hexaazacyclootadecane, 2.83 (23.2 mmol) of dimethylaminopyridine and 40 ml of DMF were added thereto, and the system was stirred for 23 hours at 80° C. After the reaction, DMF was distilled off, and the product was extracted with chloroform. The extract liquid was dried, and the solvent was distilled off to leave 8.9 g of pale yellow crystal. The crystal was purified by silica gel chromatography (with chloroform/methanol=100/1) and then recrystallized from ethanol to obtain 5.9 g of 1,4,7,10,13,16-hexa(4-hexyloxybenzoyl)-1,4,7,-10,13,16-hexaazacyclooctadecane.

Yield: 65.5% Phase transition temperatures according to DSC and X-ray diffraction.

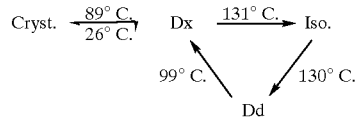

(Dx: un-identified discotic phase, Dd: discotic disordered phase)

(Example 7, Supplement)

Synthesis of 2,3,6,7,10,11-hexa(4-methylhexyloxy) triphenylene (Formula (I), R=—(CH$_2$)$_3$—CH(CH$_3$)—C$_2$H$_5$)

At room temperature, 3 ml of N,N-dimethylformamide (DMF) was placed in a flask, and 0.27 g of NaH (60% in oil) was added thereto. Then, 0.3 g (0.925 mmol) of 2,3,6,7,10,11-hexahydroxytriphenylene was added thereto, and after 1 hour of stirring, a mixture liquid of 1.96 g (6.84 mmol) of 4-methylhexyl p-toluenesulfonate and 2 ml of DMF was added dropwise thereto, followed by 5 hours of stirring at 70° C. After the reaction, the system was cooled to room temperature, and water was added thereto to precipitate a crystal, which was recovered by filtration. The crystal was then purified by silica gel chromatography (with toluene) and re-cystallized from acetone/methanol to obtain 0.24 g of 2,3,6,7,10,11-hexa(4-methylhexyloxy)triphenylene.

Yield: 28.4% Phase transition temperatures according to DSC and X-ray diffraction:

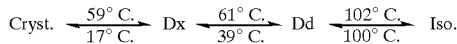

(Dx: un-identified discotic phase, Dd: discotic disordered phase)

Example 10

1,4,7,10,13,16-hexaazacyclooctadecane was reacted with 4-(5-hexenyloxy)benzoic acid chloride and then oxidized with m-chlorobenzoic acid to obtain C10(epoxy),18-N6 azacrown represented by the formula (II) (R=—CO—Ph—OC$_8$H$_{16}$C$_2$H$_3$O(epoxy)).

A liquid crystal cell was prepared in the same manner as in Example 3 except for injecting the above-prepared C10 (epoxy),18-N6 azacrown into a blank cell prepared in the same manner as in Example 3 (by using substrates coated successively with ITO and ODSE) and gradually cooled at 2° C./min. to observe an alignment state at room temperature, whereby a uniform monodomain was obtained. However, when the cell was gradually cooled down to -20° C. at a rate of 2° C./min., a crystal phase appeared to result in an ununiform alignment.

Example 11

To 100 wt. parts of C10(epoxy),18-N6 azacrown obtained in Example 10, 1 wt. part of triphenylsulfonium-hexafluorophosphate was added as a photopolymerization initiator to form a mixture. A liquid crystal cell was prepared in the same manner as in Example 10 except for using the mixture instead of the C10(epoxy),18-N6 azacrown alone, and then gradually cooled down to room temperature to observe an alignment state, whereby a uniform monodomain alignment was confirmed. Then, the cell in this state was exposed to ultraviolet rays from a high-pressure mercury lamp at a photoenergy of 1.44 J/cm$^2$ at a wavelength of 365 nm. Thereafter, the cell was cooled down to -20° C. to observe an alignment state, whereby a uniform monodomain alignment as observed at room temperature was confirmed to be retained at -20° C.

Fixation by complete solidification as by photopolymerization, etc., following the formation of a columnar structure vertical to the substrates in a discotic liquid crystal phase, is effective to reinforce a device, such as a charge-transporting channel device, having such a vertical columnar structure to be resistant to various environmental conditions, and is also effective to handle the solidified layer as a single sheet. Thus, such a charge-transporting channel mechanically reinforced by photopolymerization can be separated as a sheet from a substrate for monodomain formation and then applied onto another prescribed device substrate. This allows the selection of a device substrate regardless of the discotic liquid crystal aligning performance of the substrate.

Examples 12–19

Glass substrates (c) coated with ITO-deposited film identical to those used in Example 3 were coated with the following surfactants (a)–(d) respectively having a homeotropic alignment characteristic after dilution in the same manner as in Example 3 to obtain 4 types of substrates in totally 16 sheets.

(a) $C_{18}H_{37}Si(OMe)_3$
(b) $C_8H_{17}C_2H_4Si(OMe)_3$
(c) $C_8F_{17}H_4Si(OEt)_3$
(d) $C_{16}H_{33}NH_2$

Then, similarly as in Examples 1–3, the same types of substrates were applied to each other to form totally 8 blank cells of four types. Two cells of each type were then filled with C12,18-N6 azacrown (Example (II), R=—CO—Ph—$OC_{12}H_{25}$) and C16,18-N6 azacrown (Formula (II), R=—CO—Ph—$OC_{16}H_{33}$), respectively, and then cooled, otherwise in the same manner as in Example 3 to form 8 types of liquid crystal cells. As a result of alignment state observation, it was conformed that a homeotropic monodomain was formed and could be stably retained down to room temperature in each cell.

As a result, according to the present invention, it has become possible to form a discotic liquid crystal device wherein a uniform homeotropic monodomain is formed from a wide scope of discotic liquid crystal compounds, and by utilizing a preferential charge-transporting characteristic along its columnar structure, various application devices can be provided.

What is claimed is:

1. A discotic liquid crystal device, comprising:

substrate, and a discotic liquid crystal layer disposed in contact with the substrate and comprising discotic liquid crystal molecules each having a disk-shaped core and plural side chains connected to the core; wherein, in the discotic liquid crystal layer, the plural side chains of the discotic liquid crystal molecules are aligned vertically to the substrate at the boundary with the substrate, thereby forming a uniform columnar structure of discotic liquid crystal vertical to the substrate.

2. A device according to claim 1, wherein a preferential charge-transporting channel is formed along the columnar structure of discotic liquid crystal.

3. A device according to claim 1, wherein the plural side chains of the discotic crystal crystal molecules are vertically aligned with respect to the substrate under the action of a homeotropic alignment power imparted to the substrate in contact with the discotic liquid crystal layer.

4. A device according to claim 1, wherein the discotic liquid crystal has a discotic disordered phase directly below its isotropic phase.

5. A device according to claim 1, wherein the discotic liquid crystal comprises a cyclic crown compound.

6. The device according to claim 1, wherein the discotic liquid crystal is solidified by photopolymerization.

7. A method of aligning discotic liquid crystal, comprising: disposing in contact with a substrate a layer of discotic liquid crystal comprising discotic liquid crystal molecules each having a disk-shaped core and plural side chains connected to the core, and in the discotic liquid crystal layer, aligning the plural side chains of the discotic liquid crystal molecules vertically to the substrate, thereby forming a uniform columnar structure of discotic liquid crystal vertical to the substrate.

8. A method according to claim 7, further including a step of solidifying the discotic liquid crystal retaining the columnar structure.

* * * * *

UNITED STATES PATENT AND TRADEMARK OFFICE
CERTIFICATE OF CORRECTION

PATENT NO. : 6,159,562
DATED : December 12, 2000
INVENTOR(S) : Juninhiro Kanbe et al.

It is certified that error appears in the above-identified patent and that said Letters Patent is hereby corrected as shown below:

Sheet 1 of 3,
Replace FIG. 1C as shown.

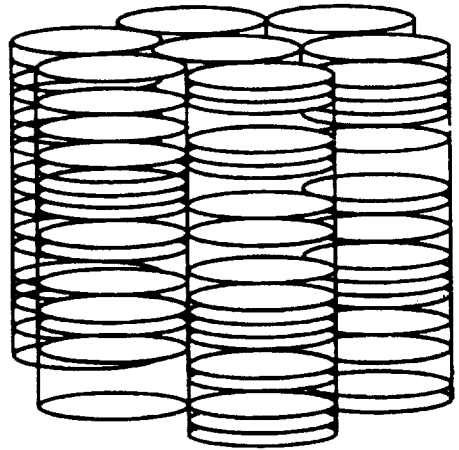

FIG. IC

Column 1,
Line 66, "consciums" should read -- conscious --.

Column 2,
Line 66, "of the core of a cyclic" should be deleted; and
Line 67, "compared" should be deleted.

Column 4,
Line 9, "FIG. 1B0 should read -- (FIG. 1B), --;
Line 47, "open" should read -- one --.

Column 5,
Line 33, "shown in FIG. 2c" should be deleted; and
Line 34, "shown in FIG. 2c" should be deleted.

Column 6,
Line 31, "clowd" should read -- cloud --.

UNITED STATES PATENT AND TRADEMARK OFFICE
CERTIFICATE OF CORRECTION

PATENT NO.    : 6,159,562
DATED         : December 12, 2000
INVENTOR(S)   : Juninhiro Kanbe et al.

It is certified that error appears in the above-identified patent and that said Letters Patent is hereby corrected as shown below:

Column 7,
Line 37, "black" should read -- blank --; and
Line 66, "he" should read -- the --.

Column 8,
Line 1, "airs" should read -- pairs --; and
Line 36, "temperature temperature" should read -- temperature of --.

Column 9,
Line 53, "2.83" should read -- 2.83g --.

Column 11,
Line 34, "conformed" should read -- confirmed --.

Column 12,
Line 4, "substrate," should read -- a substrate, --;
Line 18, "crystal crystal" should read -- liquid crystal --.

Signed and Sealed this

Twelfth Day of February, 2002

*Attest:*

*Attesting Officer*

JAMES E. ROGAN
*Director of the United States Patent and Trademark Office*